(12) United States Patent
Lee et al.

(10) Patent No.: US 7,010,693 B1
(45) Date of Patent: *Mar. 7, 2006

(54) SOFTWARE VAULT

(75) Inventors: Cadir Batista Lee, Menlo Park, CA (US); Scott William Dale, Palo Alto, CA (US)

(73) Assignee: SupportSoft, Inc., Redwood City, CA (US)

( * ) Notice: Subject to any disclaimer, the term of this patent is extended or adjusted under 35 U.S.C. 154(b) by 816 days.

This patent is subject to a terminal disclaimer.

(21) Appl. No.: 09/712,855

(22) Filed: Nov. 14, 2000

Related U.S. Application Data

(63) Continuation of application No. 09/205,418, filed on Dec. 2, 1998, now Pat. No. 6,163,859.

(51) Int. Cl.
*H04L 9/00* (2006.01)
*G06K 11/00* (2006.01)
*G06K 17/30* (2006.01)

(52) U.S. Cl. ............... 713/176; 707/204; 714/16
(58) Field of Classification Search ............... 717/170; 707/2, 1, 9, 200–204; 713/168, 176, 181–185; 380/277, 44; 714/5, 6, 16, 17, 19
See application file for complete search history.

(56) References Cited

U.S. PATENT DOCUMENTS

| | | | | |
|---|---|---|---|---|
| 5,008,853 A | * | 4/1991 | Bly et al. | 345/751 |
| 5,185,887 A | * | 2/1993 | Takahashi et al. | 707/203 |
| 5,202,982 A | | 4/1993 | Gramlich et al. | |
| 5,276,867 A | * | 1/1994 | Kenley et al. | 707/204 |
| 5,276,870 A | | 1/1994 | Shan et al. | |
| 5,301,316 A | * | 4/1994 | Hamilton et al. | 707/10 |
| 5,455,941 A | * | 10/1995 | Okuno et al. | 707/9 |
| 5,481,672 A | * | 1/1996 | Okuno et al. | 713/202 |
| 5,537,587 A | * | 7/1996 | Kelley et al. | 707/200 |
| 5,557,790 A | * | 9/1996 | Bingham et al. | 707/101 |
| 5,778,395 A | | 7/1998 | Whiting et al. | 707/204 |
| 5,996,073 A | * | 11/1999 | Lee et al. | 713/1 |
| 6,163,859 A | * | 12/2000 | Lee et al. | 714/38 |
| 6,185,697 B1 | * | 2/2001 | Shiraishi | 714/6 |
| 6,330,687 B1 | * | 12/2001 | Griffith | 714/6 |

* cited by examiner

*Primary Examiner*—Christopher Revak
(74) *Attorney, Agent, or Firm*—Fish & Richardson P.C.

(57) ABSTRACT

A computer-implemented vault centrally archives an application from a client. Each application may be formed from one or more files, and each application has a unique meta description for reconstructing the application using the one or more files. The vault has one or more files which may be shared among applications; an access controller for allowing the client to retrieve a file from the vault based on the meta description; and a post controller for allowing the client to store a single instance of a uniquely indexed file based on the meta description.

29 Claims, 13 Drawing Sheets

SOFTWARE VAULT

This application is a continuation application and claims priority under 35 U.S.C. Section 120 of U.S. application Ser. No. 09/205,418, filed Dec. 2, 1998, issued as U.S. Pat. No. 6,163,859, on Dec. 19, 2000. The disclosure of the prior application is considered part of and is incorporated by reference in the disclosure of this application.

BACKGROUND

Inexorable advances in electronics have led to widespread deployment of inexpensive, yet powerful computers that are networked together. Over time, programs installed on these computers are updated and these updates need to be maintained. Information system departments and their users face the thorny task of maintaining numerous instances of software across their complex distributed environments. The maintenance process covers a number of tasks, including software installation, synchronization, backup, recovery, analysis and repair.

A detailed knowledge of a computer's dynamic environment and its system configuration is needed in the maintenance process to prevent situations where modifications to one component may introduce problems in other components. Moreover, an accurate knowledge of the system's configuration is required to verify compatibility and to ensure integrity across multiple operating environments and across diverse processors. Software applications can have numerous components and dependencies and, in a modern network with diverse processors and peripherals, the range of possible configurations can be staggering.

Historically, relationships between software components have been manually detected and component states have been recorded in a log. This state information is external of the components themselves and must be updated whenever the components change. As state information is recorded only at the time of installation, changes made subsequent to installation may be lost. As the rate of change increases and complexity of the software configuration grows, the external state representation becomes difficult to maintain and prone to error. Moreover, during normal operation, users may make changes to the software through individual personalization and through the installation of additional software, thus changing the state information. The difference in state information between software installation and software operation can lead to unpredictable behavior and may require support from information system personnel.

SUMMARY OF THE INVENTION

In one aspect, a computer-implemented vault archives software components, where only a single instance of each component that is multiply-used is stored in the vault. The vault includes unique instances of the one or more software components and an access controller for performing a direct, random access retrieval of the one or more software components from the vault.

Implementations of the invention include one or more of the following. The access controller generates a unique key. The unique key may be used to access a software component. The unique key may be generated from a persistent metadata description. A post controller may perform a direct, random access insertion of a software component to the vault. The post controller may generate a unique key from the new component and optimizes storage if the unique key exists. A look-up controller may perform a direct, random access determination of the existence of a software component in the vault. A client may be coupled to the vault, the client having a physical software component residing on the client, the client generating a key from the physical software component. One or more secondary vaults may be coupled to the vault with a fault-tolerant rollover system for sequentially searching each vault for the presence of a target software component. The secondary vaults may be ordered based on accessibility of the vaults. A client may generate a key and apply the key to recover the target software component from the most accessible of the vaults. The client may use a metadata description to generate the key. If the search of a determined vault fails to locate the target software component, the client may skip the determined vault and modify the search order of the vaults in recovering the target software component.

In a second aspect, a computer-implemented vault archives software components, where only a single instance of each component that is multiply-used is stored in the vault. The vault includes means for storing unique instances of the one or more software components on the vault; and access means for performing a direct, random access retrieval of the one or more software components from the vault.

Implementations of the invention include one or more of the following. The access means may generate a unique key. The unique key may be used to access a software component. The unique key may be generated from a persistent metadata description. A post means may perform a direct, random access insertion of a software component to the vault. The post means may generate a unique key from the new component and optimize storage if the unique key exists. A look-up means may perform a direct, random access determination of the existence of a software component in the vault. A client may be coupled to the vault, the client having a physical software component residing on the client, the client generating a key from the physical software component. One or more secondary vaults may be coupled to the vault with means for sequentially searching each vault for the presence of a target software component. The secondary vaults may be ordered based on accessibility of the vaults. The client may have a means for applying the key to recover the target software component from the most accessible of the vaults. The client may use a metadata description to generate the key. If the search of a determined vault fails to locate the target software component, the client may skip the determined vault and modifies the search order of the vaults in recovering the target software component.

In a third aspect, a method for archiving software components where only a single instance of each component that is multiply-used is stored in a vault includes: storing unique instances of the one or more software components in the vault; and performing a direct, random access retrieval of the one or more software components from the vault.

Implementations of the invention include one or more of the following. The method may generate a unique key. The unique key may be used to access a software component. The unique key may be generated from a persistent metadata description. The method may perform a direct, random access insertion of a software component to the vault. A unique key may be generated from the new component and used to optimize storage if the unique key exists. The method may perform a direct, random access determination of the existence of a software component in the vault. A client may be coupled to the vault, the client having a physical software component residing on the client, the client generating a key from the physical software component. One or more secondary vaults may be coupled to the vault and sequentially searched for the presence of a target software component. The secondary vaults may be ordered based on accessibility of the vaults. The client may apply the key to recover the target software component from the most accessible of the vaults. The client may use a metadata description to generate the key. If the search of a determined vault fails to locate the target software component, the client may skip the determined vault and modifies the search order of the vaults in recovering the target software component.

Advantages of the invention include one or more of the following. The vault can inventory, install, deploy, maintain, repair and optimize software across local and wide area networks (LANs and WANs). By automating the human-intensive process of managing software throughout its life cycle, the vault reduces the total cost of ownership of computers in networked environments. Users can reduce the time required for software packaging by simply probing an application for its current state and storing unique instances of components of the software in a vault. Software installation may then be performed by moving valid working states from one client machine to another. Further, error prone installation of the software is avoided, increasing the out-of-box success by installing known working software states and insuring against deletion of shared components.

Moreover, the vault can be used to diagnose problems by comparing an existing state on a client computer to both a previously working state and a reference state stored in the vault. Further, the vault can be used to allow applications which have been damaged to self-heal applications by automatically restoring previously working states or reinstalling components from reference states.

The vault can also support remote and disconnected users by protecting applications on their desktop and ensuring that software is configured appropriately. The vault can also synchronize user desktops by automatically updating all application components and configuration settings while still allowing custom settings for the user. The vault also automates custom computer setups/upgrades by providing replication of working states from client machines. Information stored in the vault may be used to provide vital application information including system values and resource conflicts to help information systems personnel.

Further, the vault decreases network overhead and increases scalability of electronic software distribution by eliminating delivery of duplicate files that make up software packages. The flexible architecture of the invention protects user investment in existing solutions for enterprise-wide systems management, network management, and application management.

DESCRIPTION

Figure 1:
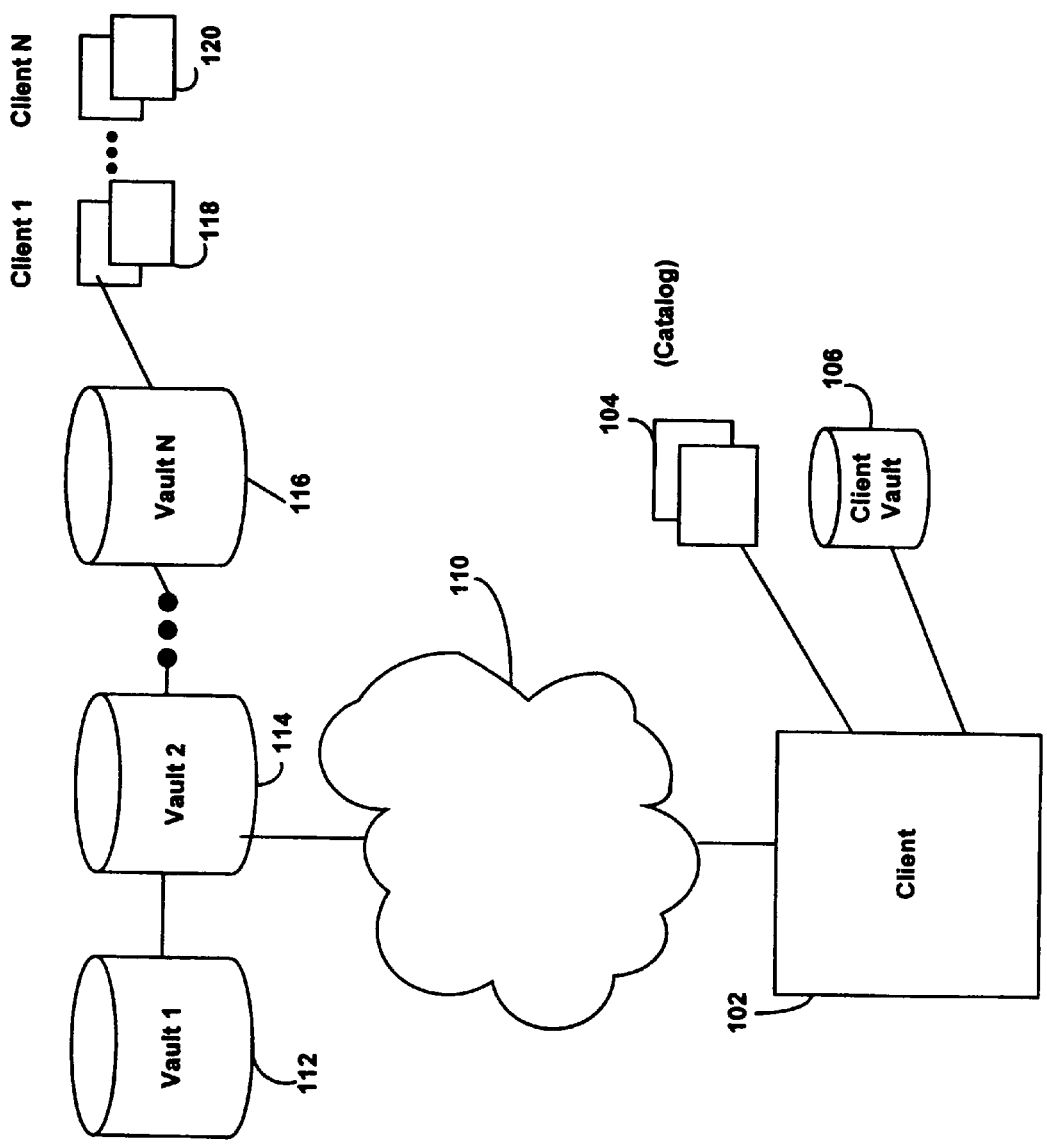
FIG. 1 is a diagram illustrating a system with one or more vaults for communicating with one or more clients.

FIG. 1 shows a computer system 100 with one or more vaults. The system 100 has one or more clients 102, each of which has a set of catalogs 104, as well as a client vault 106. The client vault 106 is a computer readable medium which stores one or more software components (entities) which are designated by the set of catalogs 104. In this case, the client vault 106 exists on a data storage device such as a hard drive on the computer system 100. Alternatively, the vault may reside on one or more data storage devices connected to a network 110, as discussed below. Each of the software components may be referenced by more than one application, and the software components are used to reconstruct the application.

Each catalog 104 includes metadata which is generated by determining run-time states of each software application. Generally, the metadata for each software application is an abstract representation of a predetermined set of functionalities tailored for a particular user during installation or customized during operation of the software application. The metadata is a list pointing to various software components (entities) making up an application software and a root entity which represents an action that may be performed by the user at another machine, place or time.

The metadata is generated by analyzing the run-time states of the software application and checking the existence of the entities and entity dependencies, which may change over time. The list of the entities is pruned by deleting overlapping entities and by combining similar entities. In the grouping of entities in the metadata, an intersection of the entities is determined such that a package of entities can be succinctly defined and that all the information necessary for it can be represented as the metadata with or without the actual entities. Enough information about each entity is included in the metadata so that an analysis of correctness may be performed. The resulting metadata provides indices to the client vault 106, which stores unique instances of software components locally to the client 102.

In addition to the client vault 106, the client 102 may also access remotely stored component files associated with the catalog 104. To access these remote component files, the client 102 communicates over the network 110, which may be an intranet, or a wide area network (WAN) such as the Internet. The network 110 may also be a local area network (LAN). Connected to the network 110 are one or more vaults 112, 114 and 116. Each of the vaults 112–116 includes sets of catalogs 118–120 which are indices of metadata files that represent the physical components of the software being "published" for the client 102.

Figure 2:
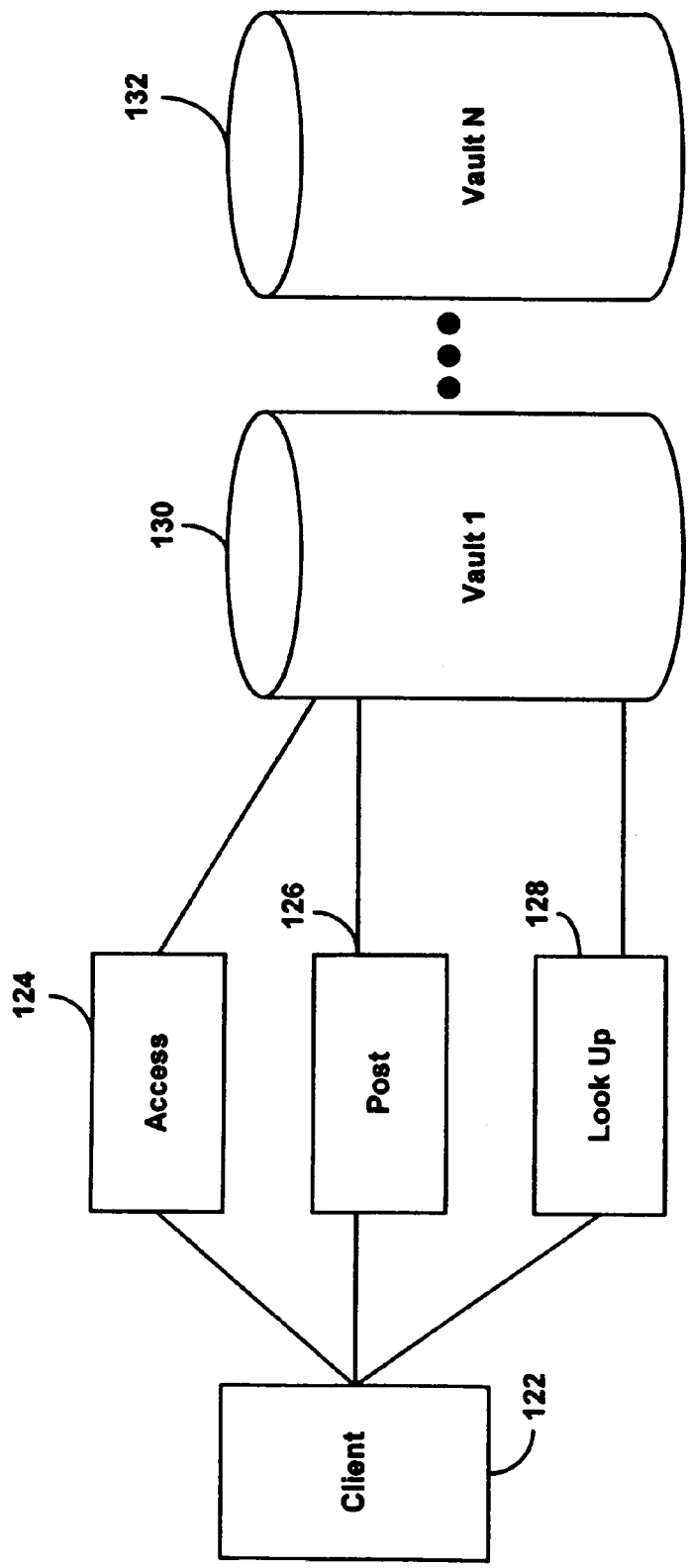
FIG. 2 is a diagram illustrating communications between the client and the one or more vaults.

FIG. 2 shows in more detail various communication modules between a client 122 and one or more vaults 130–132. The vaults 130–132 may be local vaults, remote vaults accessible from a network, or a combination of both. In FIG. 2, an access controller 124 allows the client 122 to retrieve files from the one or more vaults 130–132. A post controller 126 allows the client 122 to place one or more files on the vaults 130–132. A lookup controller 128 allows the client 122 to preview and compare catalogs of files stored locally versus files stored on the vaults 130–132. Each of controllers 124, 126 and 128 may be implemented using a processor on the client 122 and computer instructions as described below. Alternatively, each of controllers 124, 126 and 128 may be implemented using a processor 15' which is located on the network 110. Pseudo-code showing file accesses using the access controller 124, the post controller 126 and the lookup controller 128 is as follows:

```
//**** Access Controller
Pass metadata descriptor
Transform metadata descriptor into key
for each vault
   directly access key on vault
   if found then end for
next
return full URL and file for key
//**** Post Controller
Pass metadata descriptor
Transform metadata descriptor into key
for each vault
   directly access key on vault
   if found then end for
next
if not found then
   locate first writable vault
   insert file with key
end if
return
//**** Lookup Controller
Pass metadata descriptor
Transform metadata descriptor into key
for each vault
   directly access key on vault
   if found then return full URL
next
return not found
```

Figure 3:
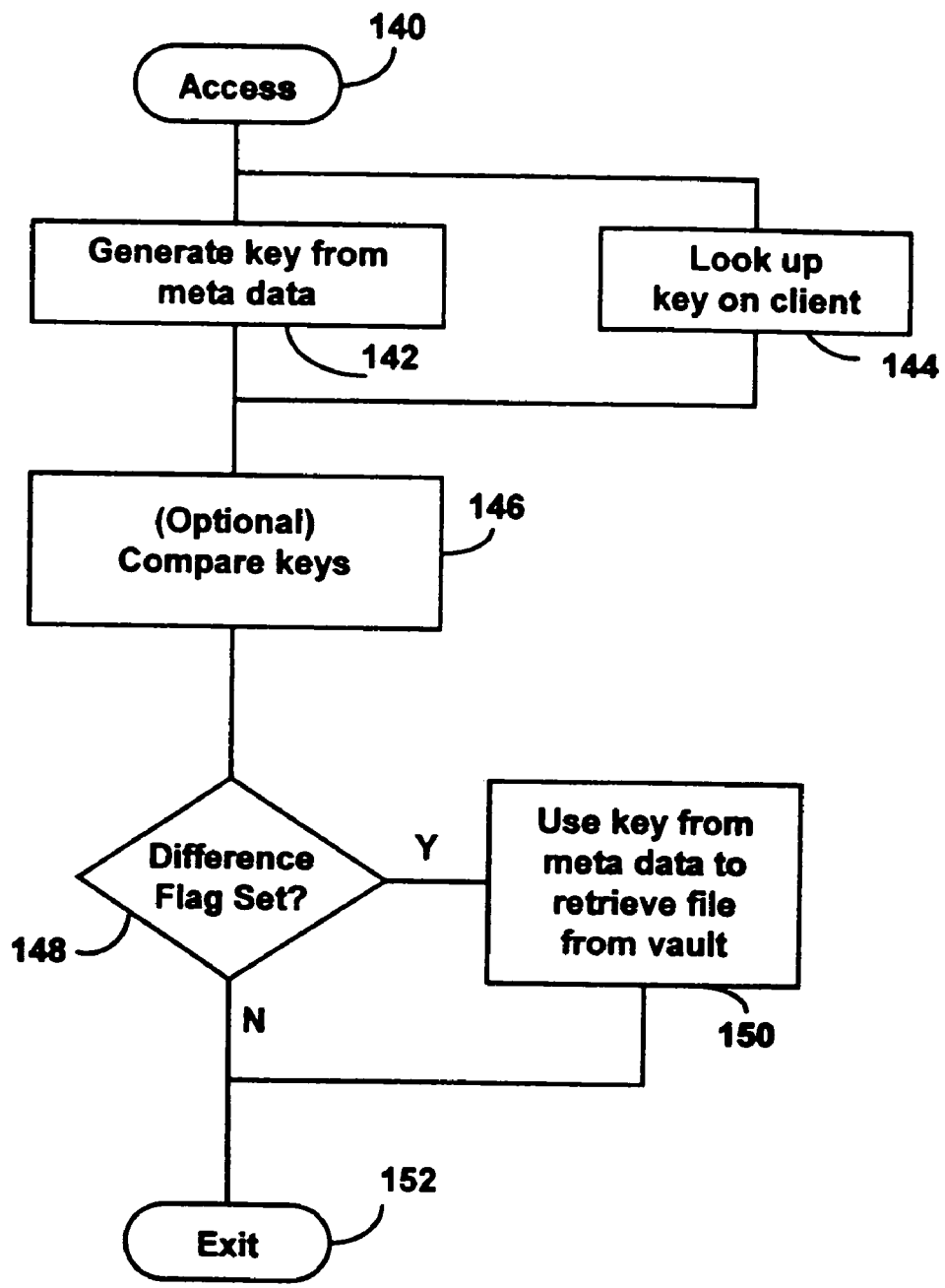
FIG. 3 is a flowchart illustrating a process for accessing software components from the vault.

Turning now to FIG. 3, a process 140 for accessing files stored on one of the vaults 130–132 is shown. The process 140 first generates a key from a metadata file (step 142). The metadata file identifies all elements that make up a single application, as identified using a state probe. The operation of the state probe is described in more detail in U.S. Pat. No. 5,996,073, entitled "System and Method for Determining Computer Application State," issued on Nov. 30, 1999, the content of which is incorporated by reference.

The metadata file describes the elements of the application, including the location of the files and the configuration of the application. The size of the metadata file is typically a small fraction of the size of the total state referenced. The key from the metadata file may be used to access and retrieve component files stored in the vaults 130–132.

If the component files of the application software to be recreated using the key are large and therefore cumbersome to transfer, it is more efficient to determine whether the component files of the application software already exist locally. Such determination may be made by first looking up the key on the client 122 (step 144) and then optionally comparing the key generated from the metadata file to the key on the client 122 (step 146) and is described in reference to FIG. 4. The key comparison process sets a flag if a difference exists and otherwise clears the flags.

The difference flag is then checked (step 148). If the difference flag is set, the key generated from the metadata file is used to retrieve software components files from the vault (step 150). Alternatively, if the flag is cleared, the desired file already exists on the client 122 and the process 140 exits (step 152). Pseudo-code for the process 140 is as follows:

```
Transform metadata descriptor into key
Using location attributes of key, locate file on client
Generate key for local file
compare metadata key and local key
if metadata key matches local key then return
for each vault
   directly access key on vault
   if found then retrieve file
next
return success if found
```

Figure 4:
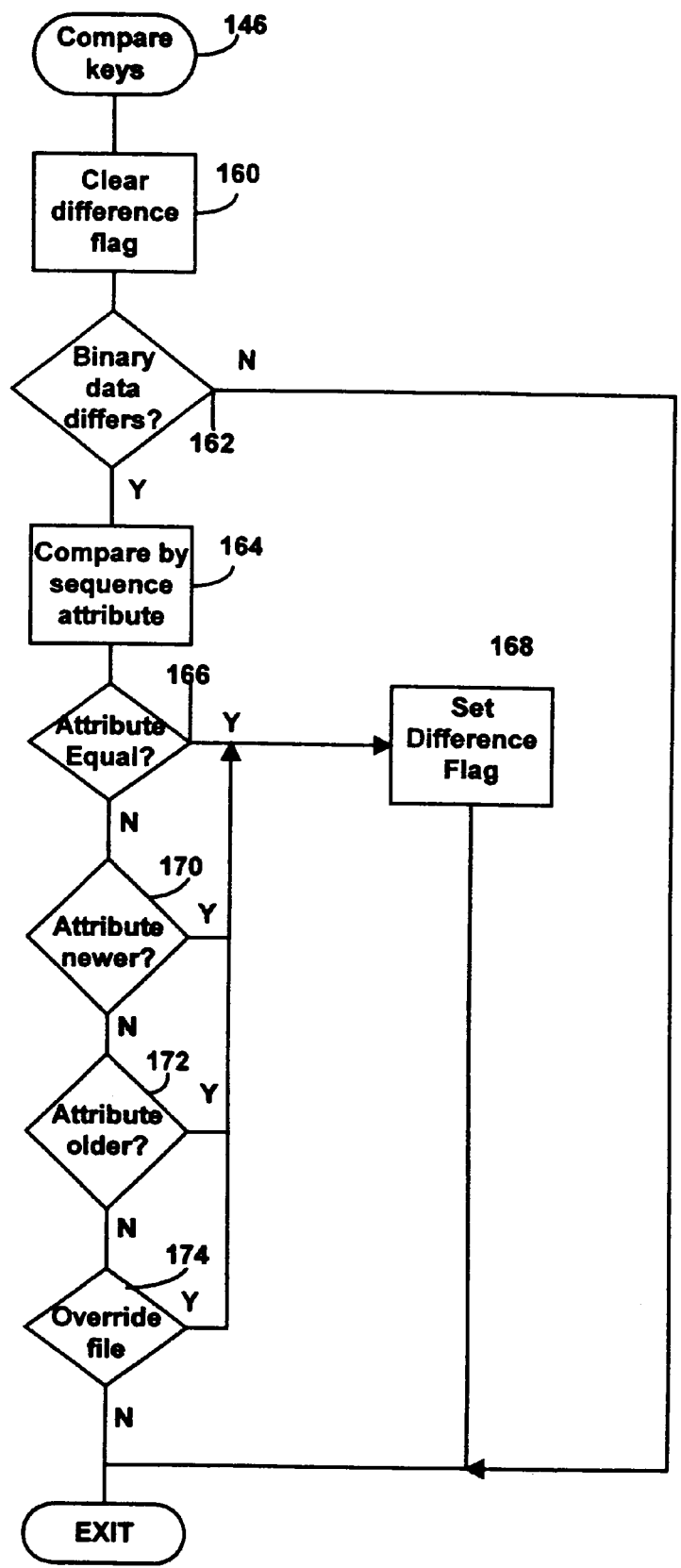
FIG. 4 is a flowchart illustrating a process for comparing keys in FIG. 3.

Turning now to FIG. 4, the key comparison step 146 of FIG. 3 is illustrated in more detail. First, the difference flag is initialized to zero (step 160). Next, the process 146 determines whether binary data associated with the files being compared are different (step 162). If no difference exists, the process exits (step 176). Alternatively, if the binary data differ, the process then compares the keys based on various sequence attributes associated with each of the files being compared (step. 164).

For example, location attributes, defined as directory paths, may be checked. Once the location attributes are determined to be equal, the sequence attributes may be used for further identification. A combination of multiple sequence attributes may be used together to reliably determine identity. Common examples of sequence attributes may include, but are not limited to, attributes such as date created, date modified, date last accessed, and version number. Certain sequence attributes may take precedence over other sequence attributes. For example, if the version numbers are not equal, date attributes may be ignored.

The process of FIG. 4 checks whether the sequence attributes are equal (step 166). If so, the difference flag is set (step 168). From step 166, if the attributes are not equal, the process checks whether one of the attributes is newer than the other (step 170). If so, the process proceeds to step 168 to set the difference flag. Alternatively, in the event that the attribute is not newer, the process then checks whether or not one of the attributes is older (step 172). If no, the process proceeds to step 168 to set the difference flag. Alternatively, in the event that one of the attributes is older, the process determines whether or not the file may be overwritten (step 174). If so, the difference flag is set (step 168). Alternatively, the process exits (step 176).

Figure 5:
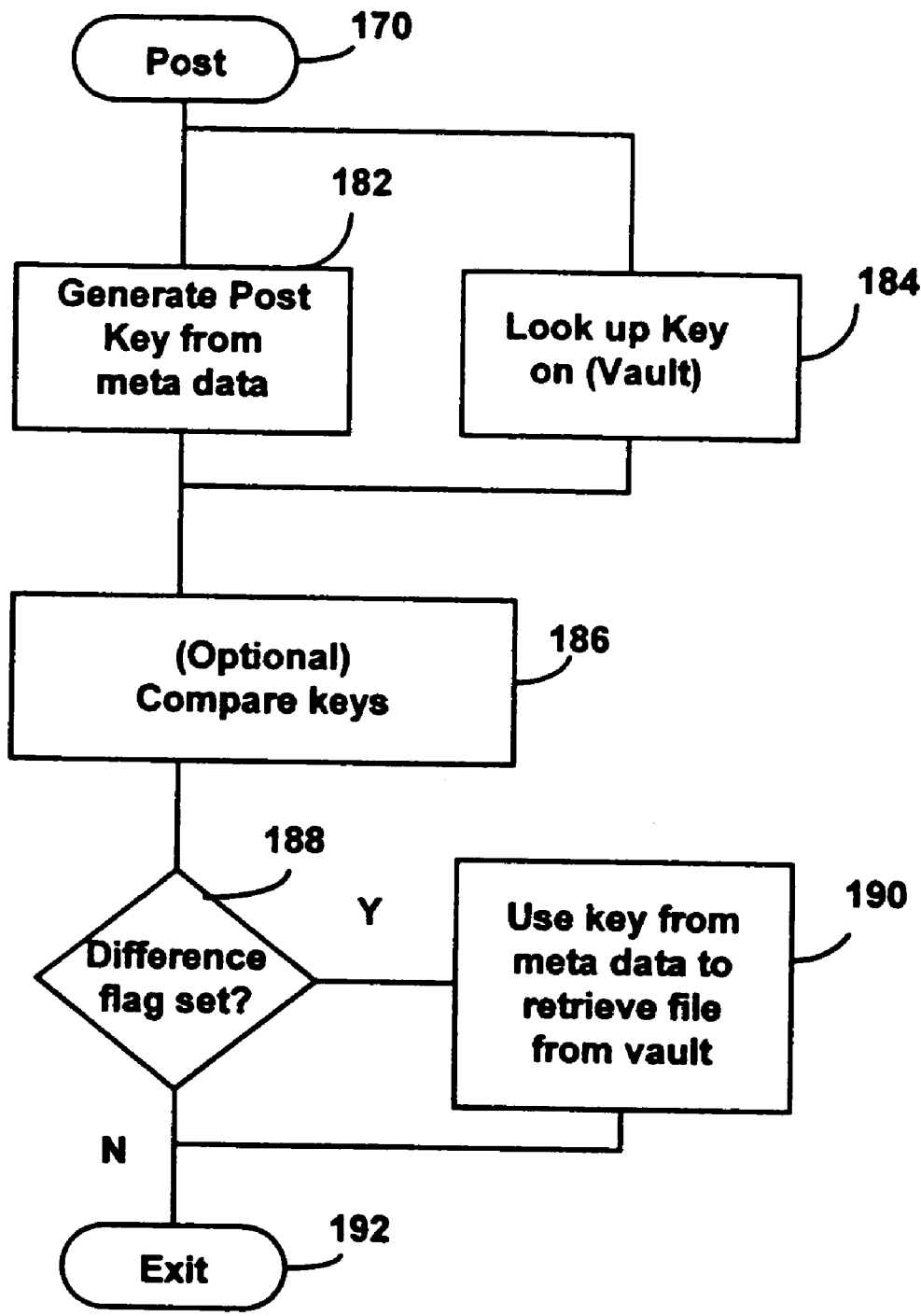
FIG. 5 is a flowchart illustrating a process for posting software components to the vault.

Referring now to FIG. 5, a flowchart illustrating a post-process 180 for placing files onto the vault is shown. The post-process 180 first generates a post key from the metadata file (step 182). Optionally, the process 180 may look up the key present on the vault (step 184) and compare the keys (step 186). If the comparison causes the difference flag to be set (step 188), the key from the metadata is used to post the file to the vault from the client (step 190). From step 188 or step 190, the process of FIG. 5 exits (step 191). Pseudo-code for the process 180 is as follows:

```
Transform metadata descriptor into key
for each vault
   directly access key on vault
   if found then end for
next
if not found then
   locate first writable vault
``` insert file with key
end if
return

Figure 6:
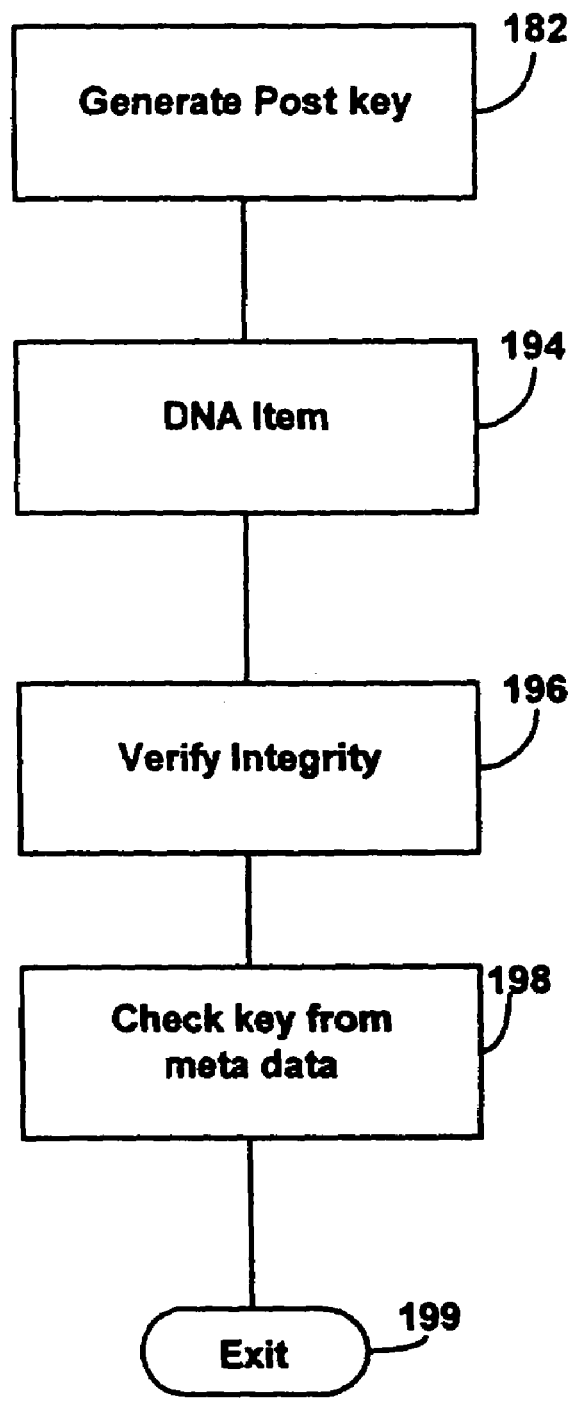
FIG. 6 is a flowchart illustrating in more detail the process for generating a post key in FIG. 5.

Turning now to FIG. 6, the process 182 of FIG. 5 to generate the post key from the metadata file is shown in more detail. In FIG. 6, metadata associated with each file is generated (step 183). Next, the process 182 verifies the integrity of the file (step 185).

Integrity is verified using a sufficiently unique byte level check to statistically guarantee that the file is intact. Various known algorithms may be used, including 32-bit checksums, cyclic redundancy checks, and hash-based functions and checksums. While any method which detects a change in the byte ordering of the file may be used, a method with high levels of statistical uniqueness and favorable performance characteristics should be used. For example, MD5 (Ron Rivest, 1992) provides a cryptographically strong checksum.

A key is then generated from the metadata (step 187) before the process 182 exits (step 189). Key generation should include an integrity checksum as described above as well as basic information about the size, name, and attributes of the file. In the form of a checksum, the key allows identity information as well as integrity information to be easily verified.

Figure 7:
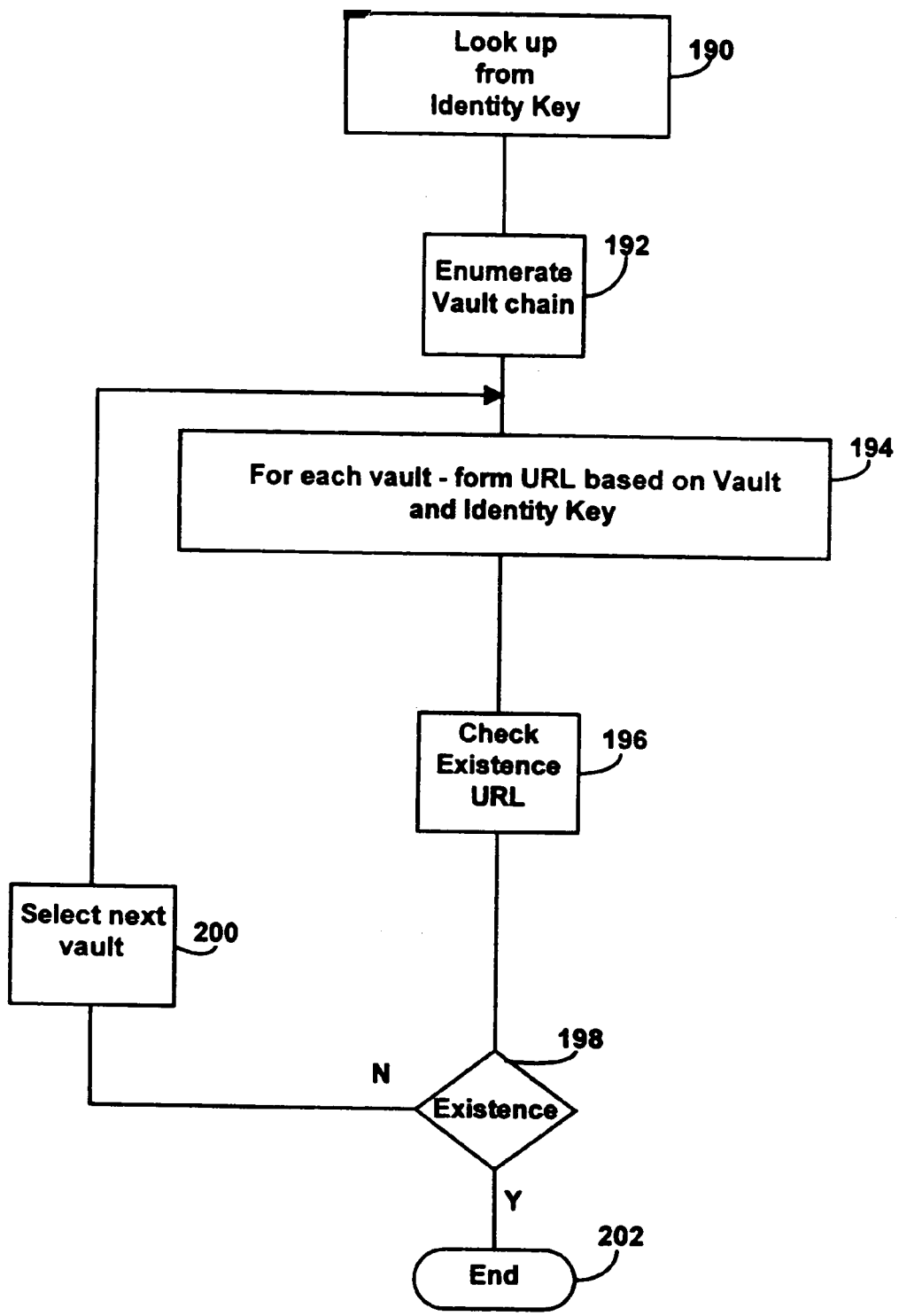
FIG. 7 is a flowchart illustrating a process for performing lookup based on an identity key.

Turning now to FIG. 7, a process 190 for performing look-ups based on an identity key is shown. The process 190 first enumerates all available vaults in a vault chain (step 192). Next, for each vault, the process 190 generates a universal resource locator (URL) based on the vault and the identity key (step 194). Next, the process 190 checks for the existence of the URL (step 196). If the URL exists in step 198, the vault has been located and the process 190 exits (step 202).

Figure 8B:
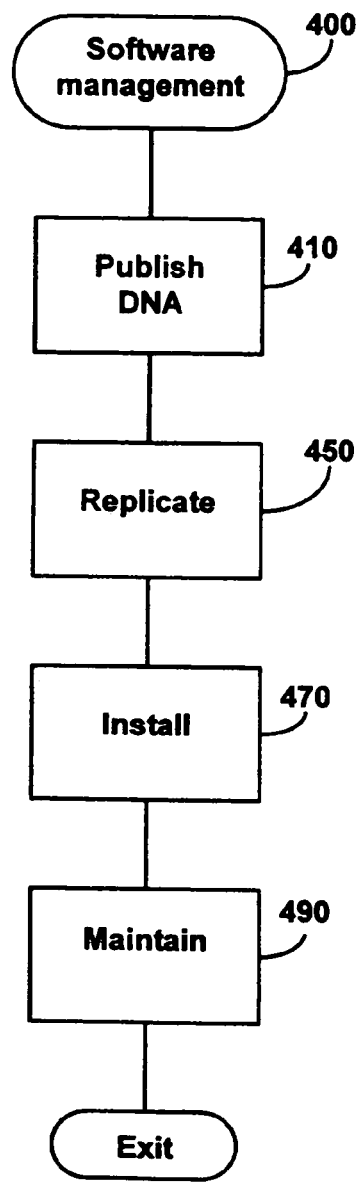
FIGS. 8A and 8B are flowcharts illustrating alternative processes for software management.
Figure 8A:
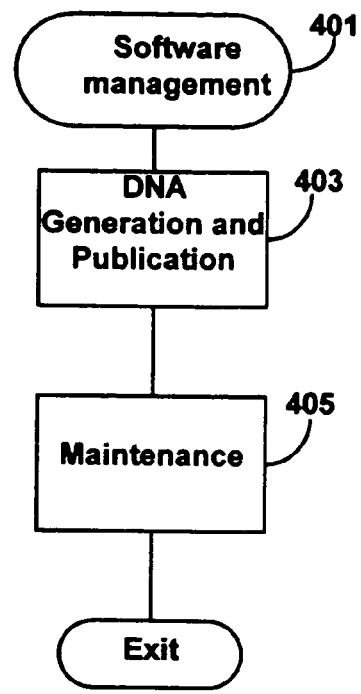

The URL specifies a unique address using one or more protocols to identify and access local and remote resources. Alternatively, if the current vault fails to offer the correct URL, the next vault is selected (step 200) before the process 190 loops back to step 194 to continue searching all vaults in the vault chain. If all vaults have been searched but the URL is not found, the process returns with an error indication. Pseudo-code for the process 190 is as follows:

Transform metadata descriptor into identity key
Construct redundant vault chain
Sort vault chain in order of closest accessibility for each vault
  form URL based on vault location and identity key
  check existence of URL
  if found then return vault location and URL
next
if not found then return error FIGS. 8A and 8B show alternative processes to provide state-based software life cycle management using a vault. Turning now to FIG. 8A, a process for performing software management first generates the metadata (step 403), as described in FIG. 1. The metadata may include DNA information, as described in more detail in the incorporated-by-reference application. The information is then used to maintain software (step 405) before the process exits. Correspondingly, FIG. 8B shows a second software life cycle management process. Initially, the metadata information is generated and published (step 410). Next, components of the software are replicated (step 450) based on the metadata. The software is then installed (step 470). After installation, the software may be maintained (step 490).

Figure 9:
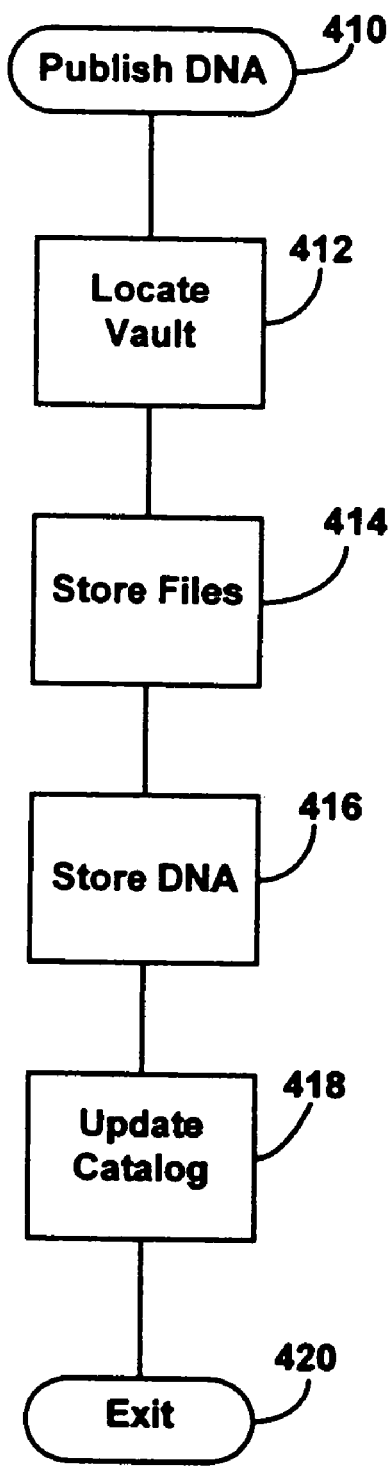
FIG. 9 is a flowchart illustrating a process for publishing meta data information associated with the software components.

Turning now to FIG. 9, the metadata publication step 410 is shown in more detail. In FIG. 9, a vault is located (step 412). The vault may be a server that maintains items referenced in the metadata files. Next, component files associated with the software are stored in the vault (step 414). Similarly, metadata is stored in the vault (step 416). A catalog, or an index of metadata files that represent the physical components of the software being published, is updated (step 418). Finally, the process 410 exits (step 420).

Figure 10:
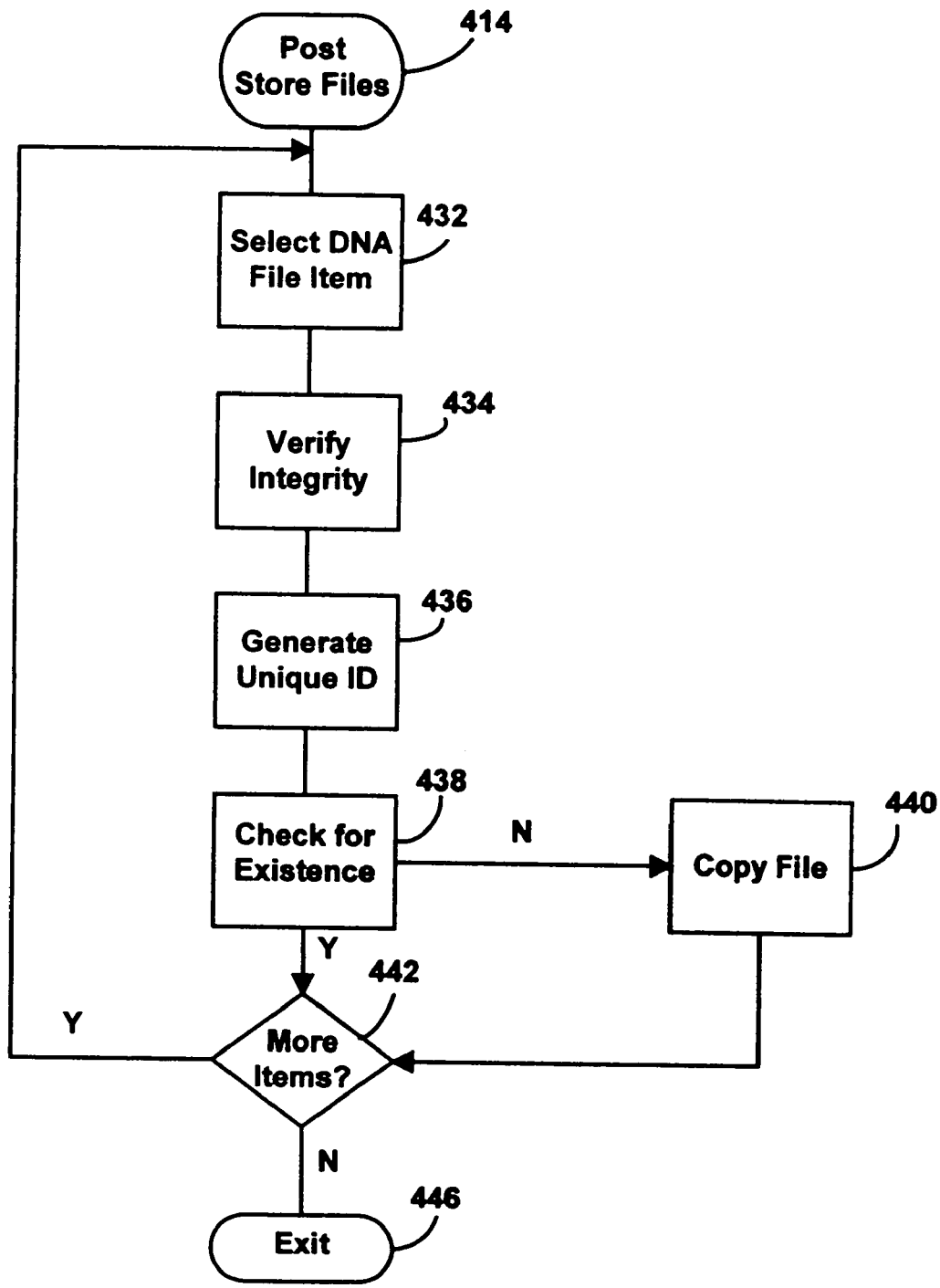
FIG. 10 is a flowchart illustrating a process for storing software components on the vault.

Turning now to FIG. 10, the file storing step 414 of FIG. 9 is shown in more detail. Each item in the metadata file is initially selected (step 432). The integrity of the item is verified (step 434). The metadata information is used to verify the integrity of the item. Simple sequence and identity attributes are compared to ensure that no change has occurred to the file. The fastest comparisons are performed first with slower but more reliable checks being performed later. By using a combination of attributes which may include the date accessed, date modified, version number, date created, multiple file checksums, block checksums, complete byte comparisons, secure file hashing, and file attribute comparison, the integrity of the file may be reliably correlated to the information in the metadata.

Figure 11:
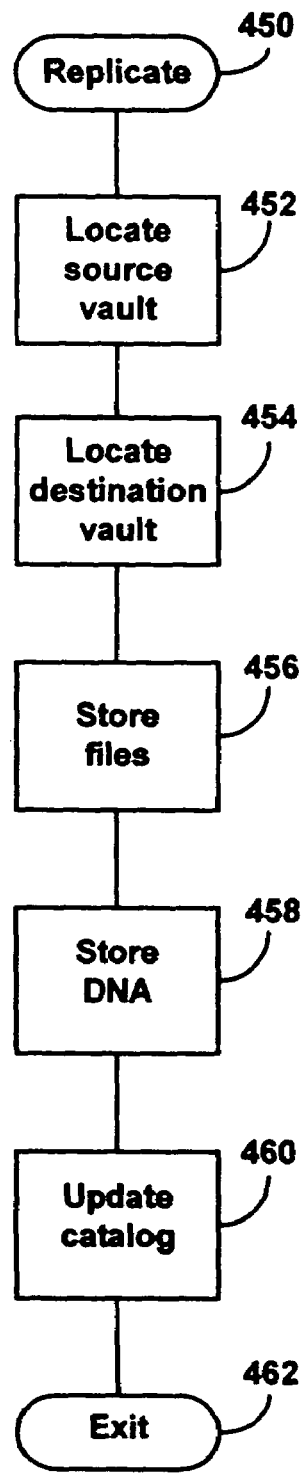
FIG. 11 is a flowchart illustrating a process for replicating software components from the vault.

The replicate step 450 of FIG. 8B is shown in more detail in FIG. 11. First, the source vault is located (step 452). Next, the destination vault is located (step 454). Files are then transferred from the source vault to the destination vault (step 456). Similarly, metadata information is copied from the source vault to the destination vault (step 458). Finally, the vault catalog is updated (step 460) before the process of FIG. 11 exits (step 462).

Figure 12:
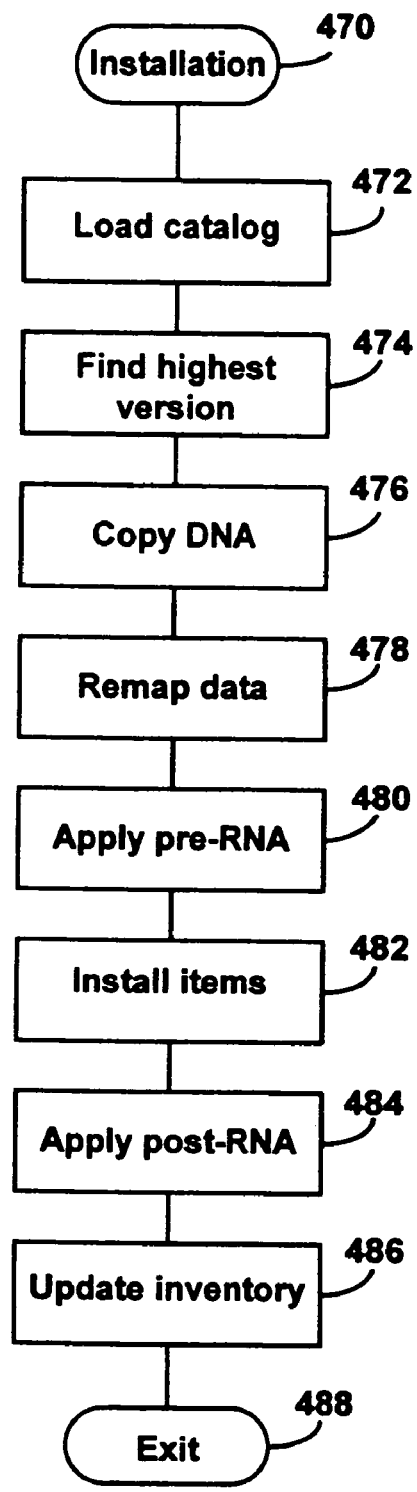
FIG. 12 is a flowchart illustrating an exemplary application of the vault in installing software.

Turning now to FIG. 12, the installation step 470 (FIG. 8B) is shown in more detail in FIG. 12. First, the vault catalog is loaded (step 472). Next, the highest version of the software stored in the vault is determined (step 474). The metadata associated with the highest version of the software is copied to the target machine (step 476). Further, data is remapped (step 478). The process of FIG. 12 then applies a preprocessing operation to the remapped data (step 480) to convert data into the proper format and set up variables appropriately, among others. Further, items associated with the software are installed (step 482). A post-processing process is applied (step 484). This step is similar to step 480 in that variables are checked and data is formatted. Finally, an inventory of the software being installed is updated (step 486) before the process exits (step 488).

Figure 13:
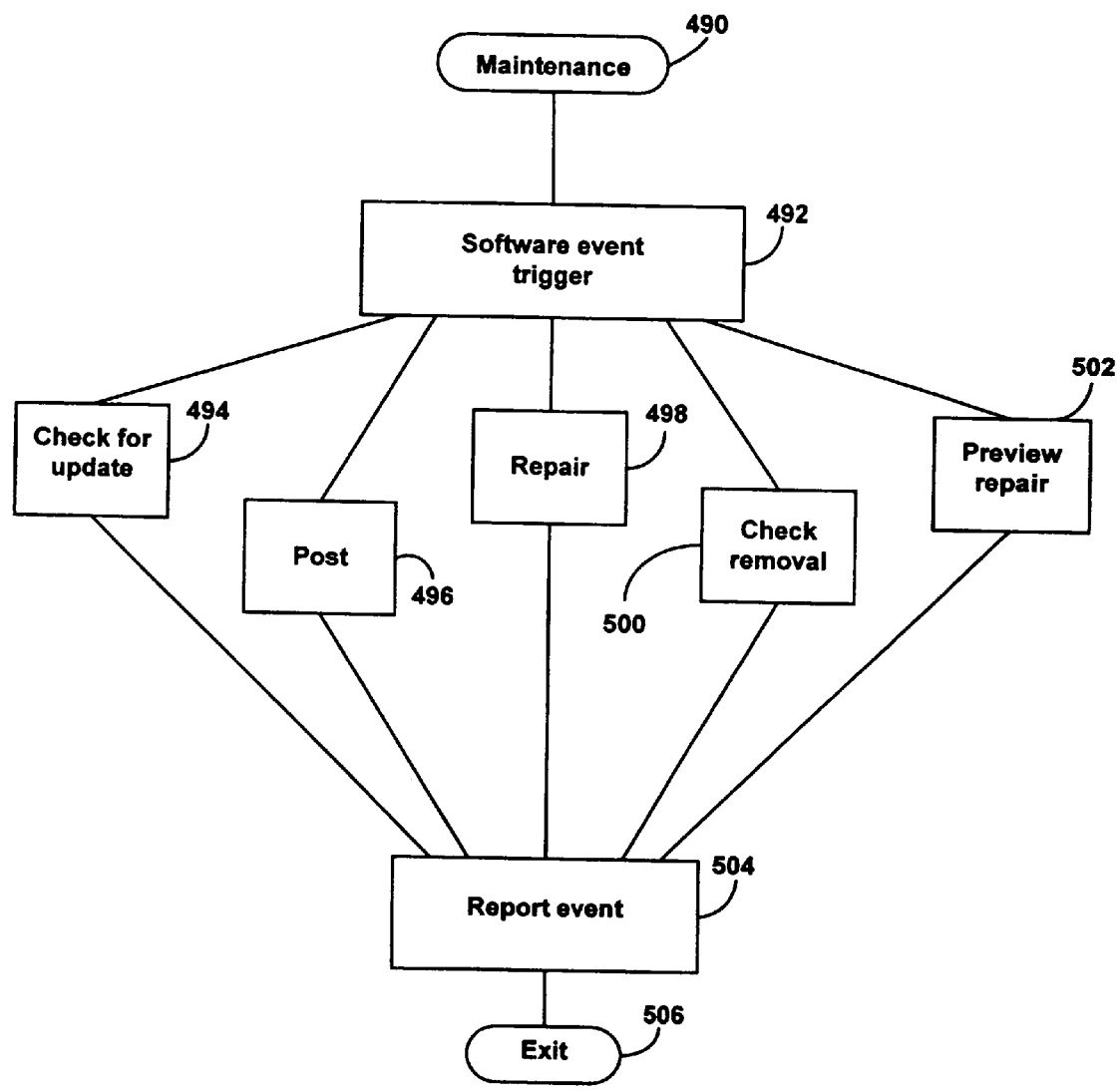
FIG. 13 is a diagram of an exemplary application for maintaining software using the vault.

Turning now to FIG. 13, the maintenance step 490 of FIG. 8B is shown in detail. The maintenance step 490 is an event driven process and thus receives a software trigger event (step 492). Based on the trigger event, the process of FIG. 13 determines various possible events, including a check for update event 494, a protect software event (step 496), a software recovery (step 498) event, a check removal event (step 500), and an examine system event (step 502). From steps 494–502, the triggering event is reported (step 504) before the process of FIG. 13 exits (step 506).

In the manner discussed above, the vault can inventory, install, deploy, maintain, repair and optimize software across LANs and WANs. The vault installs only known working software combinations and insures against deletion of shared components, thus protecting user investments in existing solutions for enterprise-wide systems management, network management, and application management.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A computer-implemented vault for archiving software components, the vault comprising:
    one or more software components stored in the vault;
    an access controller for performing a direct, random access retrieval of the one or more software components from the vault; and
    a post controller for performing a direct, random access insertion of a software component to the vault wherein the post controller generates a unique key from the new component and optimizes storage if the unique key exists.

2. A computer-implemented vault for archiving software components, the vault comprising:
    one or more software components stored in the vault;
    an access controller for performing a direct, random access retrieval of the one or more software components from the vault; and
    a client coupled to the vault, the client having a physical software component residing on the client, the client generating a key from the physical software component.

3. A computer-implemented vault for archiving software components, the vault comprising:
    one or more software components stored in the vault;
    an access controller for performing a direct, random access retrieval of the one or more software components from the vault;
    one or more secondary vaults coupled to the vault;
    a fault-tolerant rollover system for sequentially searching each vault for the presence of a target software component; and
    a client for generating a key, the client applying the key to recover the target software component from the most accessible of the vaults.

4. The computer-implemented vault of claim 3, wherein the secondary vaults are ordered based on accessibility of the vaults.

5. The computer-implemented vault of claim 3, wherein the client uses a metadata description to generate the key.

6. The computer-implemented vault of claim 3 wherein the search of a determined vault fails to locate the target software component, and wherein the client skips the determined vault and modifies the search order of the vaults in recovering the target software component.

7. A computer-implemented vault for archiving software components, the vault comprising:
    means for storing one or more software components on the vault;
    access means for performing a direct, random access retrieval of the one or more software components from the vault; and
    a post means for performing a direct, random access insertion of a software component to the vault wherein the post means generates a unique key from the new component and optimizes storage if the unique key exists.

8. A computer-implemented vault for archiving software components, the vault comprising:
    means for storing one or more software components on the vault;
    access means for performing a direct, random access retrieval of the one or more software components from the vault; and
    a client coupled to the vault, the client having a physical software component residing on the client, the client generating a key from the physical software component.

9. The computer-implemented vault of claim 8, wherein the secondary vaults are ordered based on accessibility of the vaults.

10. A computer-implemented vault for archiving software components, the vault comprising:
    means for storing one or more software components on the vault;
    access means for performing a direct, random access retrieval of the one or more software components from the vault;
    one or more secondary vaults coupled to the vault;
    means for sequentially searching each vault for the presence of a target software component; and
    a client for generating a key, the client having a means for applying the key to recover the target software component from the most accessible of the vaults.

11. The computer-implemented vault of claim 10, wherein the client uses a metadata description to generate the key.

12. The computer-implemented vault of claim 10, wherein the search of a determined vault fails to locate the target software component, and wherein the client skips the determined vault and modifies the search order of the vaults in recovering the target software component.

13. A computer-implemented method for archiving software components, the method comprising:
    storing one or more software components in a vault; and
    performing a direct, random access retrieval of the one or more software components from the vault; and
    performing a direct, random access insertion of a software component to the vault wherein said step of performing an insertion generates a unique key from the new component and optimizes storage if the key exists.

14. A method for archiving software components, the method comprising:
    storing unique instances of the one or more software components in a vault;
    performing a direct, random access retrieval of the one or more software components from the vault; and generating a key from a physical software component residing on a client coupled to the vault.

15. A method for archiving software components, the method comprising:
storing unique instances of the one or more software components in a vault that is coupled to one or more secondary vaults;
performing a direct, random access retrieval of the one or more software components from the vault;
sequentially searching each vault for the presence of a target software component; and
generating a key that can be applied to recover the target software from the most accessible of the vaults.

16. The method of claim 15, wherein the secondary vaults are ordered based on accessibility of the vaults.

17. The method of claim 15, wherein metadata description is used to generate the key.

18. The method of claim 15, wherein a search of a determined vault fails to locate the target software component, and wherein the client skips the determined vault and modifies the search order of the vaults in recovering the target software component.

19. A computer-implemented method for managing one or more software components of a software application, the method comprising:
analyzing run-time states of an application that includes one or more components and generating, for each component of the application and based on a result of analyzing run-time states, current metadata that describes the component, the analyzing and generating being performed by a client computer, and the components being stored on one or more software vaults associated with and remote from the client computer;
creating a first key for each of the one or more components of the application, each first key of a component being created from and unique to the current metadata that describes the component;
creating a second key for each of the one or more components of the application, each second key being created from and unique to metadata that was previously generated in conjunction with a previous determination of run-time states of the application; and
for each first key, comparing the first key to the second keys and, if the first key does not match any of the second keys, storing the first key's corresponding component on one of the software vaults by performing a direct random-access storage operation.

20. The method of claim 19, wherein performing a storage operation comprises:
storing the first key along with the first key's corresponding component in the first-accessed software vault.

21. The method of claim 19, wherein:
generating metadata for a component includes generating information about the size, name, and attributes of the component, and
creating a key includes verifying the integrity of the respective software component and generating an integrity checksum, and incorporating into the unique key the integrity checksum as well as information about the size, name and attributes of the respective software component.

22. A computer-implemented method for retrieving one or more software components of a software application, the method comprising:
analyzing run-time states of an application that includes one or more components and generating, for each component of the application and based on a result of analyzing run-time states, metadata that describes the component, the analyzing and generating being performed by a client computer, and the components being stored on one or more software vaults associated with and remote from the client computer;
creating a key for one of the one or more components of the application, the component being one that is to be accessed from the one or more software vaults, the key being created from and unique to the metadata that describes the component and including location attributes;
using the key to look up the software component sequentially on the one or more software vaults; and
accessing and retrieving the software component from a first software vault on which the component is found.

23. A computer-implemented method for locating one or more software components of a software application, the method comprising:
analyzing run-time states of an application that includes one or more components and generating, for each component of the application and based on a result of analyzing run-time states, metadata that describes the component, the analyzing and generating being performed by a client computer, and the components being stored on one or more software vaults associated with and remote from the client computer;
creating a key for one of the one or more components of the application, the component being one that is to be located in the one or more software vaults, the key being created from and unique to the metadata that describes the component and including location attributes;
determining an order of accessibility for the software vaults;
for each software vault, using the location of the software vault and the key, forming a uniform resource locator (URL); and
looking-up the URL in the software vaults, based on the order of accessibility, until the is located.

24. A computer-implemented method for retrieving software components of a software application, the method including comprising:
analyzing run-time states of an application that includes one or more components and generating, for each component of the application and based on a result of analyzing run-time states, metadata that describes the component the analyzing and generating being performed by a client computer, and the components being stored on one or more software vaults associated with and remote from the client computer;
transforming, for each of the one or more components, the metadata that describes the component into a key that that includes location attributes of the component; and
using the location attributes of each key, and retrieving the software components from one or more software vaults accessible to the client computer through the communications network.

25. The method of claim 24, further comprising:
determining an order of accessibility of the software vaults and retrieving the software components from the most accessible software vaults.

26. A computer-implemented method for recreating a software application, the method comprising:
analyzing run-time states of an application that includes one or more components and generating, for each component of the application and based on a result of analyzing run-time states, metadata that describes the component, the analyzing and generating being performed by a client computer, and the components being stored on one or more software vaults associated with and remote from the client computer;

transforming, for each of the one or more components, the metadata that describes the component into a first key that that includes location attributes of the component;

determining if the software components consume a large amount of file space and, upon a determination that the software components do consume a large amount of file space:

looking up, on the client computer, a second key for each of the one or more components;

for each of the one or more components, comparing the first key to the second key and, if the first and second keys do not match, retrieving the component from one or more remotely accessible software vaults, and, if the first and second keys do match, retrieving the component from the client computer; and using the retrieved software components to recreate the software application.

27. The method of claim 26, comprising:

initializing a difference flag;

determining whether first binary data associated with the software components stored on the client computer and second binary data associated with the software components stored on the remotely accessible software vaults differ;

if the first and second binary data differ, comparing the first and second keys based on sequence attributes including date created, date modified, date last accessed or version number;

if the sequence attributes are equal, if one of the sequence attributes is newer than another, or if one of the sequence attributes is older than the other and the software components with the older attribute may be overwritten, setting the difference flag; and determining that there is not a match between the first key and the second key if the difference flag is set.

28. A computer program product tangibly stored on machine-readable medium, the product comprising instructions to:

determine current run-times state of an application and generating, for each component of the application and based on a result of analyzing run-time states, metadata that describes the component; and generate a key for each component of the application, the key including a hash of the metadata, wherein a same key is generated for the same metadata; and compare a first key for a first of the application's components that is stored on a client computer with a second key for a second of the application's components that is stored on a storage device that is remote from the client computer, the keys being generated from metadata generated by determining run-time states of the application, and determine that the first and second of the application's components are the same if the keys match.

29. A computer program product tangibly stored on machine-readable medium, the product comprising instructions to:

analyze run-time states of an application that includes one or more components and generate, for each component of the application and based on a result of analyzing run-time states, current metadata that describes the component, the analyzing and generating being performed by a client computer, and the components being stored on one or more software vaults associated with and remote from the client computer;

create a first key for each of the one or more components of the application, each first key of a component being created from and unique to the current metadata that describes the component; and for each first key, compare the first key to the second keys and, if the first key does not match any of the second keys, store the first key's corresponding component on one of the software vaults by performing a direct random-access storage operation.

\* \* \* \* \*

UNITED STATES PATENT AND TRADEMARK OFFICE
CERTIFICATE OF CORRECTION

PATENT NO. : 7,010,693 B1 Page 1 of 1
APPLICATION NO. : 09/712855
DATED : March 7, 2006
INVENTOR(S) : Cadir Batista Lee and Scott William Dale It is certified that error appears in the above-identified patent and that said Letters Patent is hereby corrected as shown below:

Column 10, Claim 6, Line 1; Insert comma after "claim 3"

Column 11, Claim 17, Line 16; Replace:
 "wherein metadata" with
 -- wherein a metadata --

Column 11, Claim 21, Line 55; Replace:
 "component, and" with
 -- component; and --

Column 12, Claim 24, Line 47; Replace:
 "component the analyzing" with
 -- component, the analyzing --

Column 12, Claim 24, Line 52-53; Replace:
 "the component into a key that that includes location attributes" with
 -- the component into a key that includes location attributes --

Column 13, Claim 26, Line 7; Replace:
 "that that includes location attributes" with
 -- that includes location attributes --

Signed and Sealed this

Nineteenth Day of December, 2006

JON W. DUDAS
*Director of the United States Patent and Trademark Office*